US006622451B1

(12) United States Patent
Ellis

(10) Patent No.: US 6,622,451 B1
(45) Date of Patent: Sep. 23, 2003

(54) POLE COVER KIT

(76) Inventor: Robert Ellis, 9000 Clifton Way, #3, Beverly Hills, CA (US) 90211

( * ) Notice: Subject to any disclaimer, the term of this patent is extended or adjusted under 35 U.S.C. 154(b) by 5 days.

(21) Appl. No.: 10/098,210

(22) Filed: Mar. 18, 2002

(51) Int. Cl.[7] .............................. B32B 1/08; E04C 3/30

(52) U.S. Cl. ........................ 52/736.4; 52/737.5; 428/58; 428/174; 428/36.9

(58) Field of Search ........................... 428/99, 36.9, 58, 428/174; 52/736.3, 736.4, 737.4, 737.5; 138/162, 158, 128

(56) References Cited

U.S. PATENT DOCUMENTS

| | | | | |
|---|---|---|---|---|
| 5,122,401 A | | 6/1992 | Finkelstein | |
| D370,267 S | | 5/1996 | Bayne | |
| 5,869,159 A | | 2/1999 | Padilla | |
| 6,009,683 A | * | 1/2000 | Grewe et al. | 52/736.4 |
| 6,070,305 A | | 6/2000 | Reynolds | |

* cited by examiner

*Primary Examiner*—Alexander S. Thomas
(74) *Attorney, Agent, or Firm*—Vladimir Khiterer

(57) ABSTRACT

A pole cover kit that provides a finished surface for poles of the type found in a basement of a residence or office, where it is desired to provide a finished exterior surface is disclosed. The pole cover kit comprises a pair of substantially elongated covers arcuated throughout their length into a semicircular form that can be fixedly attached to one another to form a cylinder. A plurality of spacer means is placed between the pole and the cylinder formed by the covers along the length of the pole and maintains the cylinder in a fixed position centered around the vertical axis the pole.

Paint, wallpaper or veneer can be applied to the covers to match the décor of the basement.

12 Claims, 8 Drawing Sheets

POLE COVER KIT

FIELD OF THE INVENTION

The present invention relates to a pole cover kit that provides a finished surface for a pole. More specifically, the present invention relates to covering a cylindrical pole of the type found in a basement of a residence or office where it is desired to provide a finished exterior surface.

BACKGROUND OF THE INVENTION

In conventional residential and commercial construction, the structure's first floor is typically supported by a foundation that runs around the periphery of the building as well as by a number of columns that support horizontal joists, which in turn support the flooring above the joists. These columns are typically cylindrical steel poles with one end of the pole supporting the joist above and the other end being supported by the concrete floor of the basement. The poles are often finished with paint, which is one of the few decorative solutions available. However, the exterior surfaces of the poles are often rough and unsightly. When a basement room is being finished to create a recreation room, in the case of a house, or a storage room, in the case of a commercial building, if is often desired to provide a finished exterior surface for the poles to match the decor. Therefore, there is a need for a pole cover kit that would permit to provide a finished exterior surface for the poles by, for example, applying paint, wallpaper or veneer.

SUMMARY OF THE INVENTION

This invention satisfies this need. The pole cover kit of the present invention comprises a pair of substantially elongated covers arcuated throughout their length into a semicircular form and having a pair of opposing semicircular edges and a pair of opposing straight edges. The covers can be made from ½" or ⅝" thick plywood. Veneer can also be applied to the covers.

There is provided attachment means for fixedly attaching the covers to one another in a way that the covers form a cylinder. The attachment means can be a plurality of biscuit members and a plurality of slots, the slots disposed on the straight edges of both covers in alignment for receiving and cooperatively engaging with the biscuit members. There is also provided a glue for applying to the biscuit members and the slots, the glue is capable of effectively gluing the materials of which the biscuit members and the covers are made.

There is also provided a plurality of spacer means for placement between the pole and the cylinder formed by the covers along the length of the pole and maintaining the cylinder in a fixed position such that the cylinder is centered around the vertical axis the pole.

Each of the spacer means comprises a plurality of disks, there being an innermost and outermost disk. The disks are adapted for being concentrically oriented about the vertical axis of the pole. Each of the disks has a substantially circular outer periphery and a central substantially circular bore.

Each of the disks is being axially split into two mirror-image halves capable of connecting to one another to form the disk. The bore of the innermost disk has a diameter substantially the same as the outer diameter of the pole and the outer periphery of the outermost disk has a diameter substantially the same as the inner diameter of the cylinder.

The pole cover kit of this invention is applied to the pole by first placing the spacer means on the pole. The "mirror-image halves" are placed around the pole to form the disk. The halves can be duct taped together to hold them in place.

It is preferable to locate the spacer means approximately 10–12 inches from the top of the pole and 10–12 inches from the bottom. Depending on the diameter of the pole, additional spacer means can be placed to accommodate the interior diameter of the covers. The biscuit members are then glued in the slots and the covers are held together until the glue dries. Nylon ties or C-clamps can be used for holding the covers together until the glue dries. Once the covers are securely in place, paint or wallpaper can be applied to the covers. Alternatively, veneer can be applied to the covers.

BRIEF DESCRIPTION OF THE DRAWINGS FIGURES

DETAILED DESCRIPTION OF THE PREFERRED EMBODIMENTS

Figure 1:
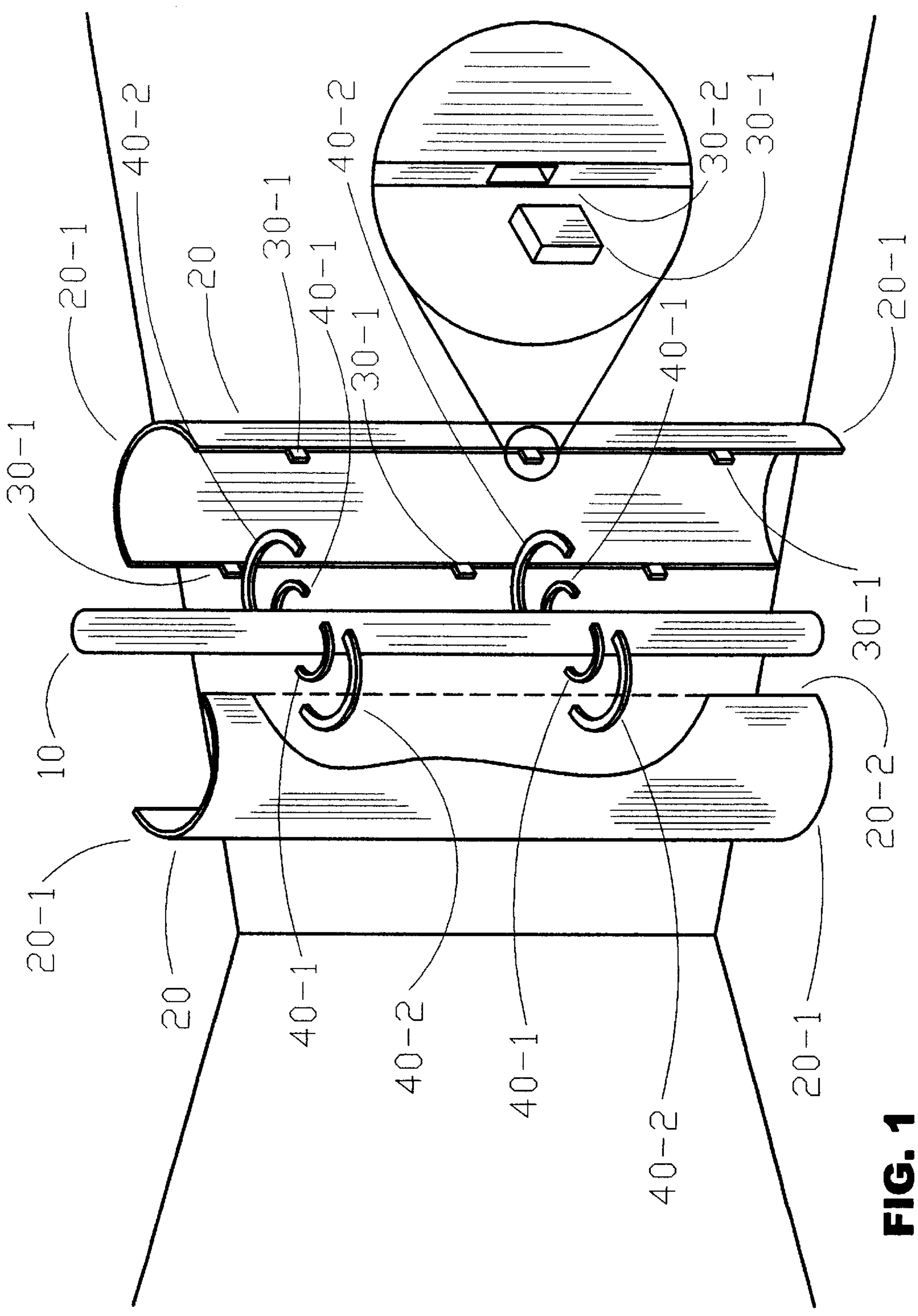
FIG. 1 shows an exploded isometric view of the pole cover kit according to the first embodiment of this invention.
Figure 2:
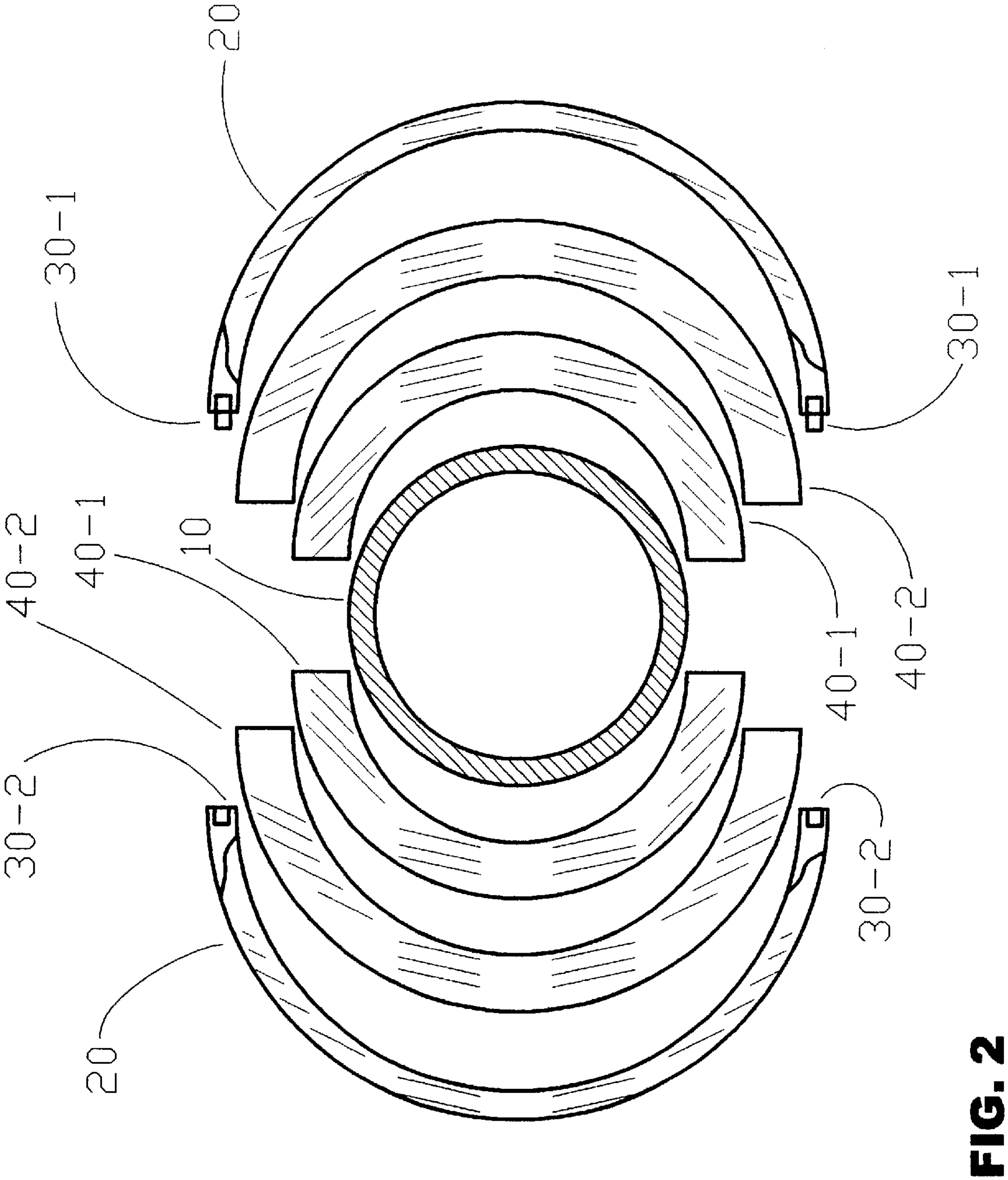
FIG. 2 shows an exploded top plan view of the pole cover kit according to the first embodiment of this invention.
Figure 3:
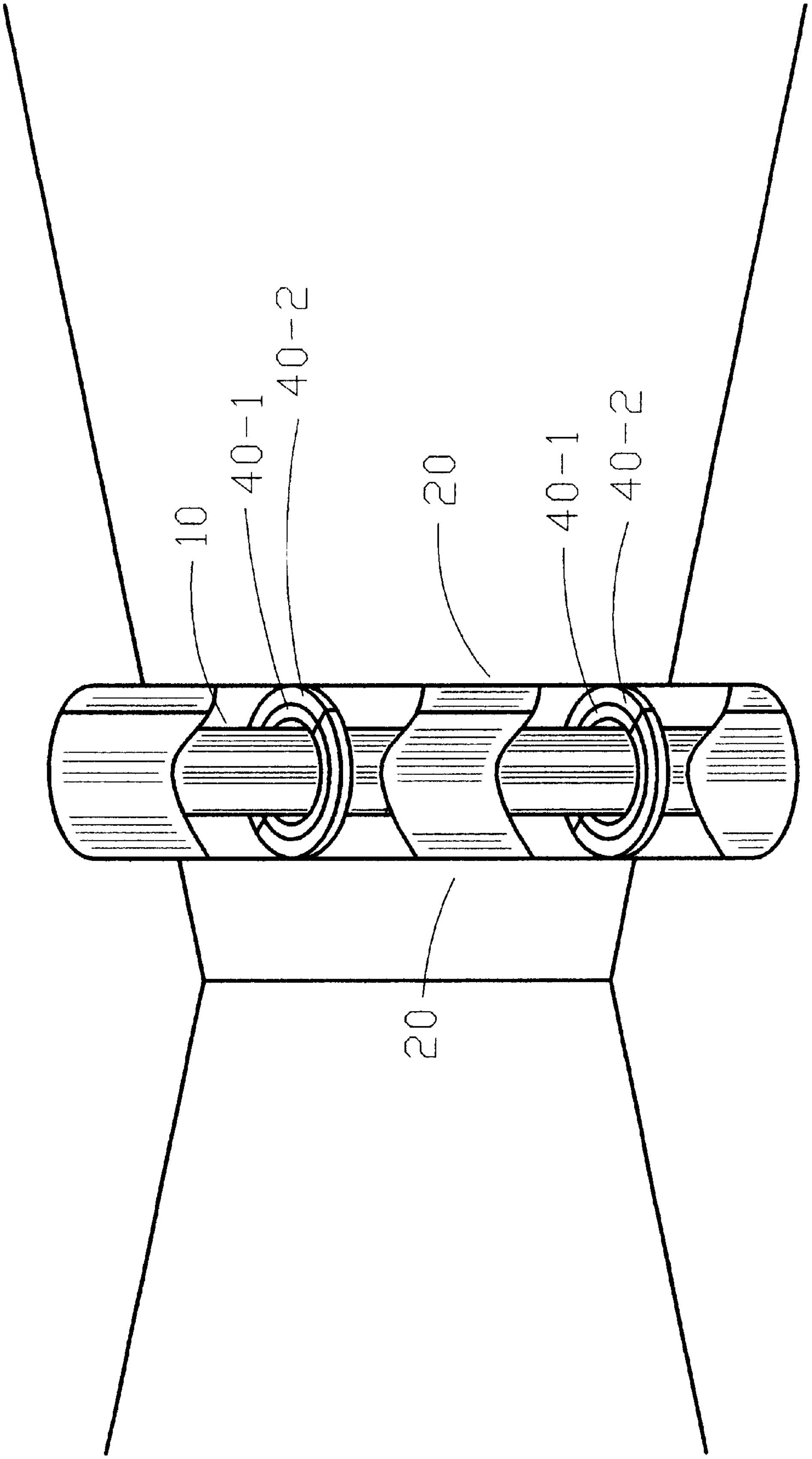
FIG. 3 shows an isometric view of the pole cover kit in the assembled condition according to the first embodiment of this invention.
Figure 4:
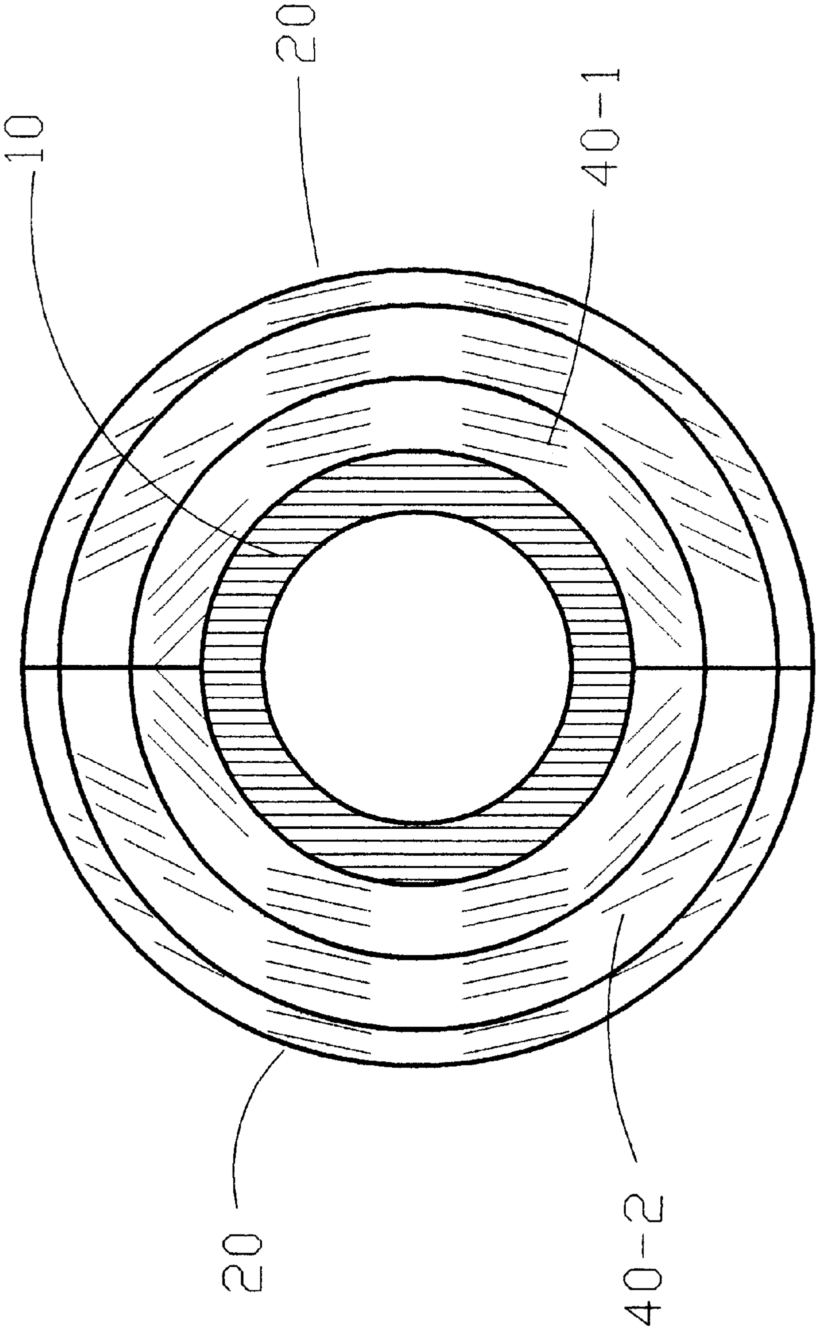
FIG. 4 shows a top plan view of the pole cover kit in the assembled condition according to the first embodiment of this invention.
Figure 5:
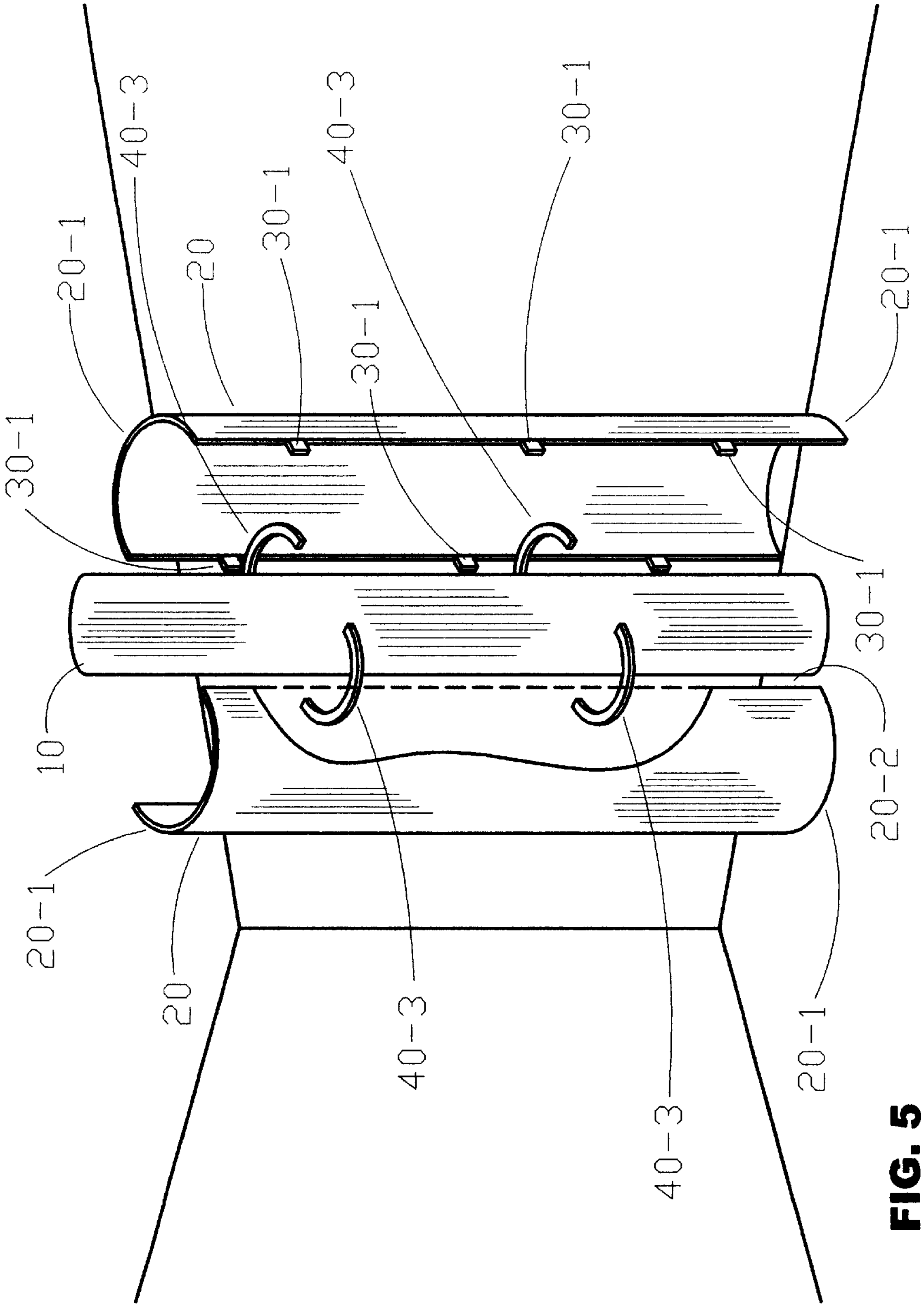
FIG. 5 shows an exploded isometric view of the pole cover kit according to the second embodiment of this invention.
Figure 6:
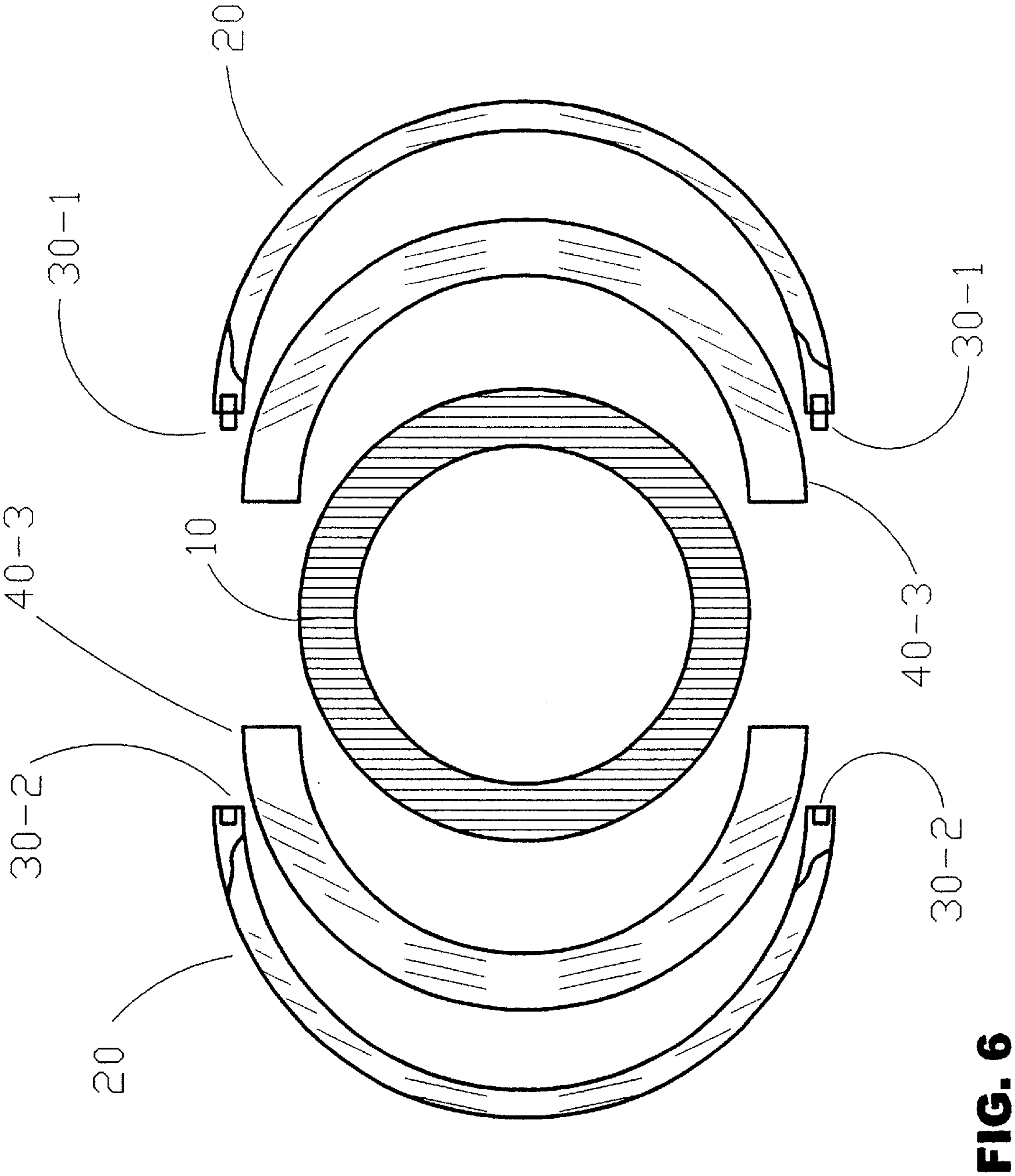
FIG. 6 shows an exploded top plan view of the pole cover kit according to the second embodiment of this invention.
Figure 7:
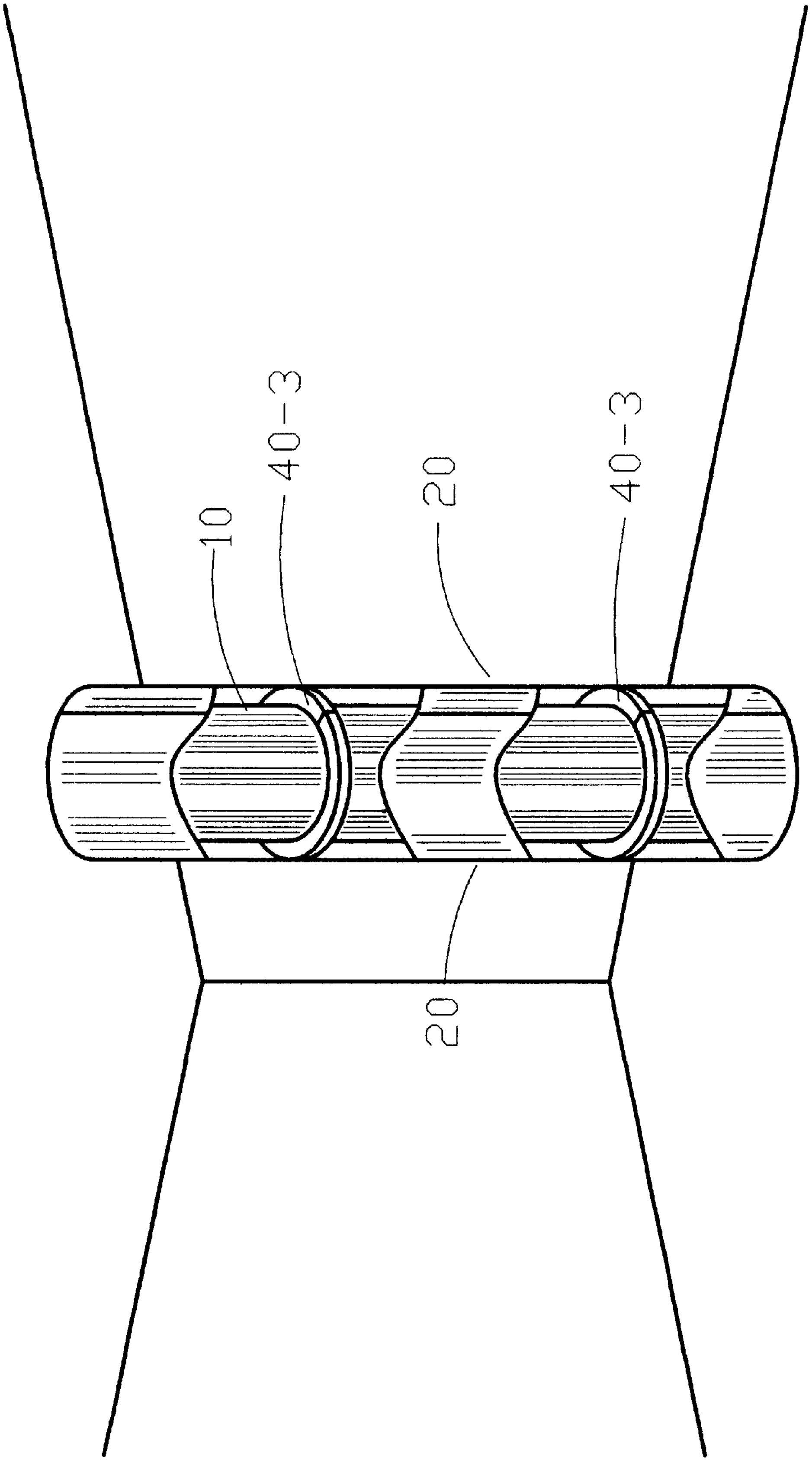
FIG. 7 shows an isometric view of the pole cover kit in the assembled condition according to the second embodiment of this invention.
Figure 8:
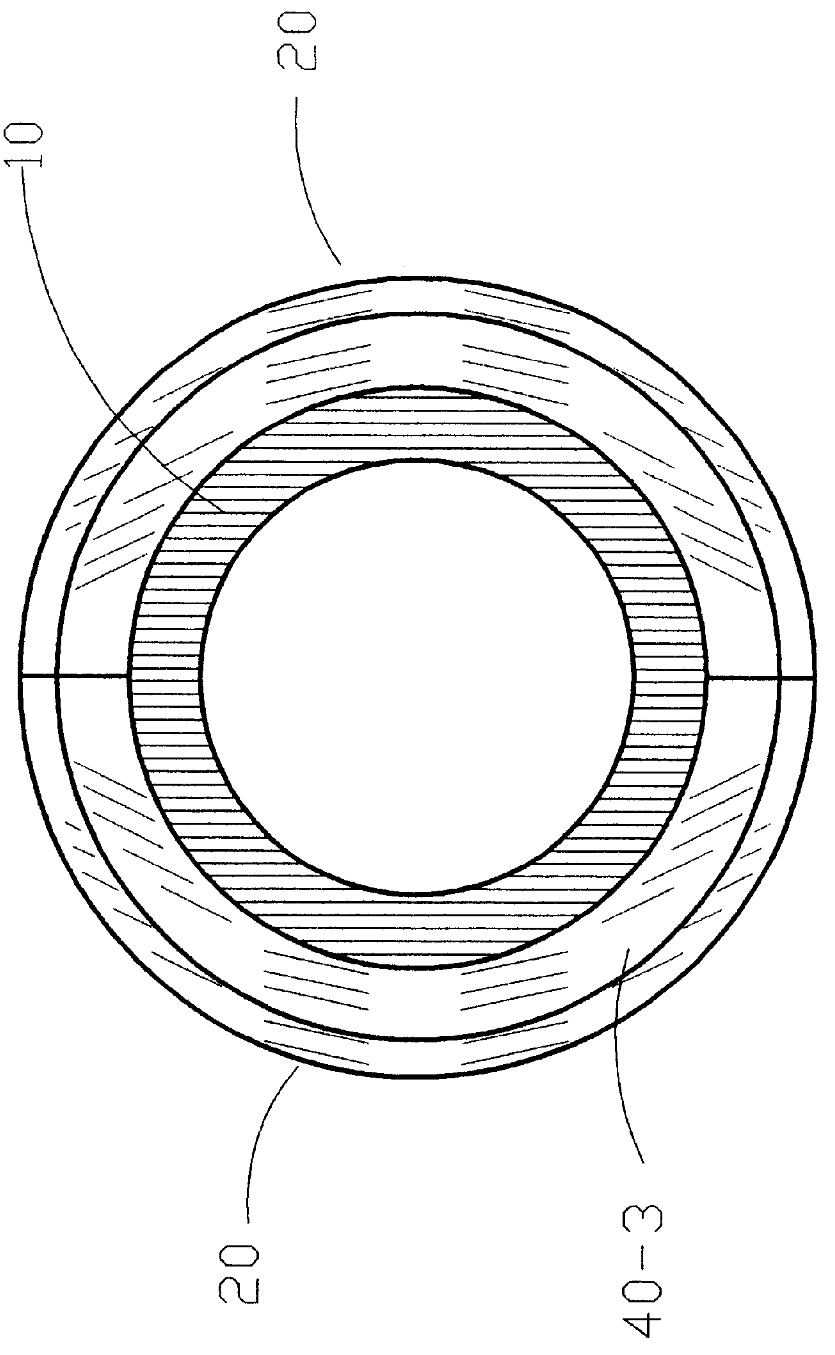
FIG. 8 shows a top plan view of the pole cover kit in the assembled condition according to the second embodiment of this invention.

This invention will be better understood with the reference to the drawing figures FIG. 1 through FIG. 8. The same numerals and letters refer to the same elements in all drawing figures.

Viewing, simultaneously, FIG. 1, FIG. 2, FIG. 3 and FIG. 4, numeral 10 indicates a pole. Pole 10 is of the type of cylindrical steel poles with one end of Pole 10 supporting the joist above and the other end being supported by the concrete floor of the basement.

Numeral 20 indicates a cover. There are two Covers 20, each of Cover 20 is substantially elongated and arcuated throughout its length into a semicircular form. Each of Cover 20 has a pair of opposing semicircular edges indicated by numeral 20-1 and a pair of opposing straight edges indicated by numeral 20-2. Covers 20 can be made from ½" or ⅝" thick plywood. Veneer can also be applied to the outer surface of Covers 20.

There is provided attachment means for fixedly attaching Covers 20 to one another in a way that Covers 20 form a cylinder. Specifically, numeral 30-1 indicates biscuit members and numeral 30-2 indicates a slot. Three Slots 30-2 are shown on each Straight Edge 20-2, even thought the number of Slots 30-2 disposed on Straight Edges 20-2 can be different, limited only by the size of Straight Edges 20-2 and the size of Slots 30-2. Slots 30-2 are disposed on Straight Edges 20-2 in alignment for receiving and cooperatively engaging with Biscuit Members 30-1. There is also provided a glue for applying to Biscuit Members 30-1 and Slots 30-2, the glue is capable of effectively gluing the materials of which Biscuit Members 30-1 and Covers 20 are made.

There is also provided a plurality of spacer means for placement between Pole 10 and the cylinder formed by Covers 20 along the length of Pole 10 and maintaining the cylinder in a fixed position such that the cylinder is centered around the vertical axis Pole 10.

Specifically, each of the spacer means comprises a plurality of disks. There are shown two disks in each of the spacer means, even though only one disk or more than two disks can be used, depending on the outside diameter of Pole 10 and inside diameter of Covers 20. Numeral 40-1 indicates an innermost disk and numeral 40-2 indicates an outermost disk. Innermost Disk 40-1 and Outermost Disk 40-2 are adapted for being concentrically oriented about the vertical axis of Pole 10. Innermost Disk 40-1 and Outermost Disk 40-2 have a substantially circular outer periphery and a central substantially circular bore.

Innermost Disk 40-1 and Outermost Disk 40-2 are being axially split into two mirror-image halves capable of connecting to one another to form the disk. The bore of Innermost Disk 40-1 has a diameter substantially the same as the outer diameter of Pole 10. The outer periphery of Outermost Disk 40-2 has a diameter substantially the same as the inner diameter of the cylinder formed by Covers 20.

The pole cover kit of this invention is applied to Pole 10 by first placing the "mirror-image halves" of Innermost Disk 40-1 around Pole 10 to form the disk. The halves can be duct taped together to hold them in place. The "mirror-image halves" of Outermost Disk 40-2 are then placed on top of Innermost Disk 40-1 in the same manner. It is preferable to locate the spacer means approximately 10–12 inches from the top of the pole and 10–12 inches from the bottom.

Biscuit Members 30-1 are then glued in Slots 30-2 and Covers 20 are held together until the glue dries. Nylon ties can be used for holding Covers 20 together until the glue dries. Once Covers 20 are securely in place, paint or wallpaper can be applied to Covers 20.

Viewing now, simultaneously, FIG. 5, FIG. 6, FIG. 7 and FIG. 8, the only difference with, respectively FIG. 1, FIG. 2, FIG. 3 and FIG. 4 is that the outside diameter of Pole 10 is larger in FIG. 5, FIG. 6, FIG. 7 and FIG. 8 than that in FIG. 1, FIG. 2, FIG. 3 and FIG. 4. Thus, only one disk, indicated by numeral 40-3, is required to maintain the cylinder formed by Covers 20 in a fixed position such that the cylinder is centered around the vertical axis Pole 10. The bore of Disk 40-3 has a diameter substantially the same as the outer diameter of Pole 10. The outer periphery of Disk 40-3 has a diameter substantially the same as the inner diameter of the cylinder formed by Covers 20.

While the present invention has been described and defined by reference to the preferred embodiment of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A pole cover kit comprising:

(a) a pair of substantially elongated covers, each of said covers arcuated throughout its length into a semicircular form and having a pair of opposing semicircular edges and a pair of opposing straight edges;

(b) attachment means for fixedly attaching said covers to one another in a way that said covers form a cylinder;

(c) a plurality of spacer means, each of said spacer means is for placement between the pole and the cylinder along the length of the pole and maintaining said cylinder in a fixed position such that the cylinder is centered around the vertical axis the pole;

wherein each of said spacer means comprises a plurality of disks, there being an innermost and outermost disk, the disks adapted for being concentrically oriented about the vertical axis of the pole, each of said disks has a substantially circular outer periphery and a central substantially circular bore, each of said disks being axially split into two mirror-image halves capable of connecting to one another to form the disk, such that the bore of the innermost disk has a diameter substantially the same as the outer diameter of the pole and the outer periphery of the outermost disk has a diameter substantially the same as the inner diameter of the cylinder.

2. A pole cover kit as in claim 1, wherein said attachment means comprise a plurality of biscuit members and a plurality of slots, said slots disposed on said straight edges of both covers in alignment for receiving and cooperatively engaging with said biscuit members.

3. A pole cover kit as in claim 2, wherein said attachment means further comprise a glue for applying to said biscuit members and said slots, said glue capable of effectively gluing the materials of which said biscuit members and said covers are made.

4. A pole cover kit as in claim 2, wherein said covers are made from ½" thick plywood.

5. A pole cover kit as in claim 2, wherein said covers are made from ⅝" thick plywood.

6. A pole cover kit as in claim 5, further comprising veneer applied to the outer surfaces of said covers.

7. A pole cover kit comprising:

(a) a pair of substantially elongated covers, each of said covers arcuated throughout its length into a semicircular form and having a pair of opposing semicircular edges and a pair of opposing straight edges;

(b) attachment means for fixedly attaching said covers to one another in a way that said covers form a cylinder;

(c) a plurality of spacer means, each of said spacer means is for placement between the pole and the cylinder along the length of the pole and maintaining said cylinder in a fixed position such that the cylinder is centered around the vertical axis the pole;

wherein each of said spacer means comprises a disk having a substantially circular outer periphery and a central substantially circular bore, each of said disks being axially split into two mirror-image halves capable of connecting to one another to form the disk, such that the bore of the disk has a diameter substantially the same as the outer diameter of the pole and the outer periphery of the disk has a diameter substantially the same as the inner diameter of the cylinder.

8. A pole cover kit as in claim 7, wherein said attachment means comprise a plurality of biscuit members and a plurality of slots, said slots disposed on said straight edges of both covers in alignment for receiving and cooperatively engaging with said biscuit members.

9. A pole cover kit as in claim 8, wherein said attachment means further comprise a glue for applying to said biscuit members and said slots, said glue capable of effectively gluing the materials of which said biscuit members and said covers are made.

10. A pole cover kit as in claim 8, wherein said covers are made from ½" thick plywood.

11. A pole cover kit as in claim 8, wherein said covers are made from ⅝" thick plywood.

12. A pole cover kit as in claim 11, further comprising veneer applied to the outer surfaces of said covers.

* * * * *